(12) United States Patent
Hieda (10) Patent No.: US 7,274,389 B1
(45) Date of Patent: Sep. 25, 2007

(54) CAMERA APPARATUS AND IMAGE PROCESSING SYSTEM WITH VARIABLE RESOLUTION

(75) Inventor: Teruo Hieda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/058,204

(22) Filed: Apr. 10, 1998

(30) Foreign Application Priority Data

May 1, 1997 (JP) .................................. 9-114016

(51) Int. Cl.
*H04N 5/225* (2006.01)
*H04N 5/232* (2006.01)
*H04N 7/12* (2006.01)
*H04N 11/02* (2006.01)

(52) U.S. Cl. .............................. 348/207.1; 348/390.1; 348/211.8

(58) Field of Classification Search ............. 348/357.1, 348/390.1, 392.1, 552, 14.01, 222.1, 231.3, 348/231.6, 211.99, 211.4, 211.6, 211.8, 14.12, 348/522, 333.05, 333.01, 333.11, 207.1; 382/299; 715/800, 801
See application file for complete search history.

(56) References Cited

U.S. PATENT DOCUMENTS

| | | | | |
|---|---|---|---|---|
| 4,851,922 A * | 7/1989 | Takayama et al. | ........... | 358/451 |
| 4,901,152 A | 2/1990 | Hieda et al. | ................. | 358/209 |
| 5,355,328 A * | 10/1994 | Arbeiter et al. | ............. | 348/445 |
| 5,389,965 A * | 2/1995 | Kuzma | ......................... | 348/14 |
| 5,479,206 A * | 12/1995 | Ueno et al. | ................. | 348/552 |
| 5,481,297 A * | 1/1996 | Cash et al. | .................... | 348/13 |
| 5,585,848 A | 12/1996 | Hieda et al. | ................. | 348/297 |
| 5,606,366 A | 2/1997 | Hieda et al. | ................. | 348/297 |
| 5,631,701 A * | 5/1997 | Miyake | ...................... | 348/222 |
| 5,640,202 A | 6/1997 | Kondo et al. | ............... | 348/222 |
| 5,786,851 A | 7/1998 | Kondo et al. | ............... | 348/222 |
| 5,801,686 A * | 9/1998 | Jurascheck et al. | ...... | 715/500.1 |
| 5,883,678 A * | 3/1999 | Yamaguchi et al. | ...... | 348/390.1 |
| 5,978,020 A * | 11/1999 | Watanabe et al. | ....... | 348/207.99 |
| 6,144,411 A * | 11/2000 | Kobayashi et al. | ......... | 348/231 |
| 6,335,760 B1 * | 1/2002 | Sato | ........................ | 348/397.1 |
| 6,366,263 B1 * | 4/2002 | Takasu et al. | ................. | 345/13 |
| 6,429,896 B1 * | 8/2002 | Aruga et al. | ........... | 348/231.99 |
| 6,900,832 B1 * | 5/2005 | Yano | ..................... | 348/333.01 |
| 7,050,096 B2 * | 5/2006 | Porter et al. | .............. | 348/207.1 |
| 2001/0050692 A1 * | 12/2001 | Suh et al. | ..................... | 345/670 |
| 2002/0080250 A1 * | 6/2002 | Ogawa et al. | .............. | 348/552 |
| 2003/0038883 A1 * | 2/2003 | Takahashi et al. | ........ | 348/207.1 |
| 2005/0046725 A1 * | 3/2005 | Sasagawa | .............. | 348/333.01 |

(Continued)

FOREIGN PATENT DOCUMENTS

EP      0 205 712      12/1986

(Continued)

*Primary Examiner*—John M. Villecco
(74) *Attorney, Agent, or Firm*—Fitzpatrick, Cella, Harper & Scinto (57) ABSTRACT

In an image capture apparatus, the data rate of image data output from the image capture device is changed by calculating a first data rate of the image data according to a first size of a variable display area that displays the image data. Information indicating the calculated first data rate is sent to the image capture apparatus. The size of the variable display area is changed to a second size responsive to a user command and a second data rate of the image data is calculated according to the second size. Information indicating the calculated second data rate is sent to image capture device.

13 Claims, 4 Drawing Sheets

U.S. PATENT DOCUMENTS

2005/0140990 A1* 6/2005 Ueno et al. .................. 382/298
2005/0157948 A1* 7/2005 Lee ............................ 382/299

FOREIGN PATENT DOCUMENTS

| | | | |
|---|---|---|---|
| EP | 0604009 A1 * | 2/1993 | |
| EP | 0 597 793 | 5/1994 | |
| JP | 6-266831 | 9/1994 | |
| JP | 406266831 A * | 9/1994 | |
| JP | 7-298112 | 11/1995 | |
| JP | 7-322195 | 12/1995 | |
| JP | 8-140066 | 5/1996 | |
| JP | 10-210425 | 8/1998 | |
| JP | 10285488 A * | 10/1998 | |

* cited by examiner

CAMERA APPARATUS AND IMAGE PROCESSING SYSTEM WITH VARIABLE RESOLUTION

BACKGROUND OF THE INVENTION

1. Field of the Invention

The present invention relates to camera apparatuses, such as video cameras, and image processing systems for applying specified image processing to an image signal obtained by camera apparatuses, and more particularly, to a camera apparatus for outputting a digitized image signal and an image processing system provided with the camera apparatus.

2. Description of the Related Art

Computers have recently handled multimedia information, such as images and sound, as their technology has advanced.

For example, an image signal obtained by taking a picture with a video camera is input to a personal computer (hereinafter called a PC) and the PC manipulates or stores the input image signal as motion-picture data. Alternatively, the PC obtains one image among the motion-picture data as still-picture data, places the image on a document, and prints it together with characters.

Since IEEE 1394 has been specified as a standard format of an image signal to be input to a PC, a video camera employing a method (hereinafter just called a digital method) for outputting a digitized image signal (digital image signal) has been commercially sold or proposed.

Such a PC handles considerably smaller amounts of data, such as that generated in the specifications of 320 (horizontal) by 240 (vertical) pixels, 15 frames per second, and non-interlaced scanning, than NTSC-format data, which is generated in the specifications of 640 (horizontal) by 240 (vertical) pixels, 60 fields per second, and 2:1 interlaced scanning, due to the processing-capacity limit of the central processing unit (CPU).

On the other hand, a digital-method video camera usually outputs NTSC-format data generated in the specifications of 640 by 240 pixels, 60 fields per second, and 2:1 interlaced scanning, or data generated in the specifications of 640 by 480 pixels, 30 frames per second, and non-interlaced scanning.

Since the output data rate of the video camera is fixed to a certain rate as described above and the rate is different from that which can be handled by a PC, when a digital image signal output from the video camera is handled in a PC, it is necessary to convert the data rate of the digital image signal output from the video camera into the specified data rate in a conversion circuit built in the PC or to convert it by software processing by the use of a conversion program stored in advance in the PC.

When a conversion circuit is built in a PC to convert the data rate of a digital image signal, since the conversion circuit is very expensive, the cost of the whole system increases.

On the other hand, when the data rate of a digital image signal is converted by software processing in a PC, if the processing capacity of the CPU is not very large, the number of frames per second and the number of pixels in an image displayed on the screen or stored in the PC decrease.

SUMMARY OF THE INVENTION

Accordingly, it is an object of the present invention to provide a camera apparatus which allows a digital image signal having a variable data rate to be output to obtain a high-quality image with no image-quality deterioration without changing the data rate of an input digital image signal in a low cost unit externally connected.

Another object of the present invention is to provide an image processing system provided with a camera apparatus allowing a digital image signal having a variable data rate to be output to obtain a high-quality image with no image-quality deterioration without converting the data rate of a digital image signal obtained by the camera apparatus when certain image processing is applied to the digital image signal.

The foregoing objects are achieved in one aspect of the present invention through the provision of a camera apparatus outputting a digital image signal obtained by taking a picture of a subject by the use of image-pickup means, including variable data rate conversion means for converting the digital image signal to a digital image signal having the data rate corresponding to a control signal given from the outside, including a specified output data rate.

According to another aspect of the invention, a data rate of image data output from an image capture apparatus is changed by calculating a first data of the image data according to a first variable display area size for displaying the image data. Information indicating the calculated first data rate is sent to the image capture apparatus. In response to a user command, the size of the variable display area is changed from the first size to a second size. A second data rate for the image data is calculated according to the second size and information is sent indicating the calculated second data rate to the image capture apparatus.

According to another aspect of the invention, an apparatus that changes the data rate of image data output from an image capture device has a calculating device which calculates a first data rate of the image data according to a first variable display area size for displaying the image data. A sending unit sends information indicating the calculated first data rate to the image capture apparatus. If the variable display area size is changed from the first data size to a second size by user command, the calculating device calculates a second data rate for the image data according to the second size and the sending unit sends information indicating the calculated second data rate to the image capture device.

According to another aspect of the invention, a storage medium stores a computer readable program that changes data rate of image data output from an image capture device. In performing the program, a first data rate of the image data is calculated according to a first size of a variable display area that displays the image data and information indicating the calculated first data rate is sent to the image capture device. The size of the variable display area is changed from the first size to a second size by user command and a second data rate of the image data is calculated according to the second size. Information indicating the calculated second data rate is sent to the image capture device.

According to another aspect of the invention, an image capture device has an image capture unit that captures a digital image and a conversion unit converts the digital image into image data. A data rate changing unit changes the data rate of the image data according to a data rate calculated by an external apparatus. The external apparatus calculates a first data rate of the image data according to a first size of a variable display area for displaying the image data. Information indicating the calculated first data rate is sent to the image capture device, If a user command changes the size of the variable display area from a first size to a second size, the external apparatus calculates a second data rate of the image data according to the second size and sends the information indicating the calculated data rate to the image capture apparatus.

According to another aspect of the invention, the data rate of image data to be outputted from an image capture apparatus is changed. A data rate calculated by an external apparatus is received and the data rate of the image data is changed according to the received data rate. The external apparatus calculates a first data rate of the image data according to a first size of a variable display area for displaying the image data and sends information indicating the calculated first data rate to the image capture device. If the size of the variable display area is changed from the first size to a second size by use command, the external device calculates the second data rate of the image data according to the second size and sends information indicating the calculated second data rate to the image capture device.

Since a digital image signal having the data rate corresponding to a specified output data rate given from the outside is output, a camera apparatus which allows a digital image signal having the data rate specified by an external unit to be output can be implemented. When this camera apparatus is connected to a digital image input terminal of a personal computer, for example, the hardware and the software of the personal computer can display or store a digital image signal having the required data rate at high quality with no image-quality deterioration, without converting the data rate of the input digital image signal. In this case, since it is unnecessary to build a conventional expensive conversion circuit into the personal computer, the cost of the whole system is reduced.

In the camera apparatus, the image-pickup means may include a charge-coupled device of the all-pixel read type.

Since interlaced scanning does not need to be considered when the variable data rate conversion means converts the data rate of a digital image signal, a digital image signal having high quality can be output.

In the camera apparatus, the variable data rate conversion means may include filter means for limiting the frequency band of the digital image signal, obtained by taking the picture of the subject, to the spatial-frequency band based on the control signal, and re-sampling means for re-sampling the digital image signal to which band limitation is applied by the filter means, by the use of the re-sampling clock based on the control signal.

Image deterioration such as aliasing distortion caused by the conversion of the data rate of a digital image signal in the variable data rate conversion means can be prevented. The maximum resolution at the specified output data rate can be obtained.

The filter means may limit the frequency band of the digital image signal, obtained by taking the picture of the subject, to the time-frequency band based on the control signal.

Image deterioration such as aliasing distortion in the time domain caused by a reduced frame rate can be prevented.

The camera apparatus may be configured such that the control signal includes specifying information for specifying the digital image signal to be output, and the variable data rate conversion means converts the data rate of only the digital image signal specified by the specifying information.

Since only the desired digital image signal can be output at the desired data rate, the load of a connected external unit such as a personal computer is reduced.

The foregoing objects are achieved in another aspect of the present invention through the provision of an image processing system including: camera means for outputting the digital image signal obtained by taking a picture of a subject by the use of image-pickup means; and image processing means for applying certain image processing to the digital image signal sent from the camera means, wherein the image processing means includes setting means for setting the data rate of the digital image signal output from the camera means, and sends a control signal including the output data rate set by the setting means to the camera means, and the camera means includes variable data rate conversion means for converting the digital image signal, obtained by taking the picture of the subject, to a digital image signal having the data rate corresponding to the control signal given from the image processing means, and outputs the digital image signal obtained in conversion by the variable data rate conversion means to the image processing means.

Since the camera means outputs a digital image signal having the data rate corresponding to a specified output data rate given from the image processing means, a camera apparatus which allows a digital image signal having the data rate specified by the image processing means to be output can be implemented. Therefore, the image processing means can apply certain image processing to a digital image signal having the required data rate at high quality with no image-quality deterioration, without converting the data rate of the digital image signal sent from the camera means. In this case, since it is unnecessary to provide a conventional expensive conversion circuit for the image processing means, the cost of the whole system is reduced.

In the image processing system, the image-pickup means may include a charge-coupled device of the all-pixel read type.

Since interlaced scanning does not need to be considered when the variable data rate conversion means of the camera means converts the data rate of a digital image signal, a digital image signal having high quality can be output from the camera means.

In the image processing system, the variable data rate conversion means may include filter means for limiting the frequency band of the digital image signal, obtained by taking the picture of the subject, to the spatial-frequency band based on the control signal, and re-sampling means for re-sampling the digital image signal to which band limitation is applied by the filter means, by the use of the re-sampling clock based on the control signal.

Image deterioration such as aliasing distortion caused by the conversion of the data rate of a digital image signal in the variable data rate conversion means of the camera means can be prevented. The maximum resolution at the specified output data rate can be obtained.

The filter means may limit the frequency band of the digital image signal, obtained by taking the picture of the subject, to the time-frequency band based on the control signal.

Image deterioration such as aliasing distortion in the time domain caused by a reduced frame rate can be prevented.

The image processing system may be configured such that the image processing means includes specifying means for specifying the digital image signal output from the camera means, and sends a control signal including the information of the digital image signal specified by the specifying means to the camera means, and the variable data rate conversion means converts the data rate of only the digital image signal based on the control signal.

Since only the desired digital image signal specified by the image processing means can be output at the desired data rate from the camera means, the load of the image processing means is reduced.

Other objects and features of the present invention will be clearly understood by the following descriptions of embodiments and the accompanying drawings.

DESCRIPTION OF THE PREFERRED EMBODIMENT

An embodiment of the present invention will be described below by referring to the drawings.

Figure 1:
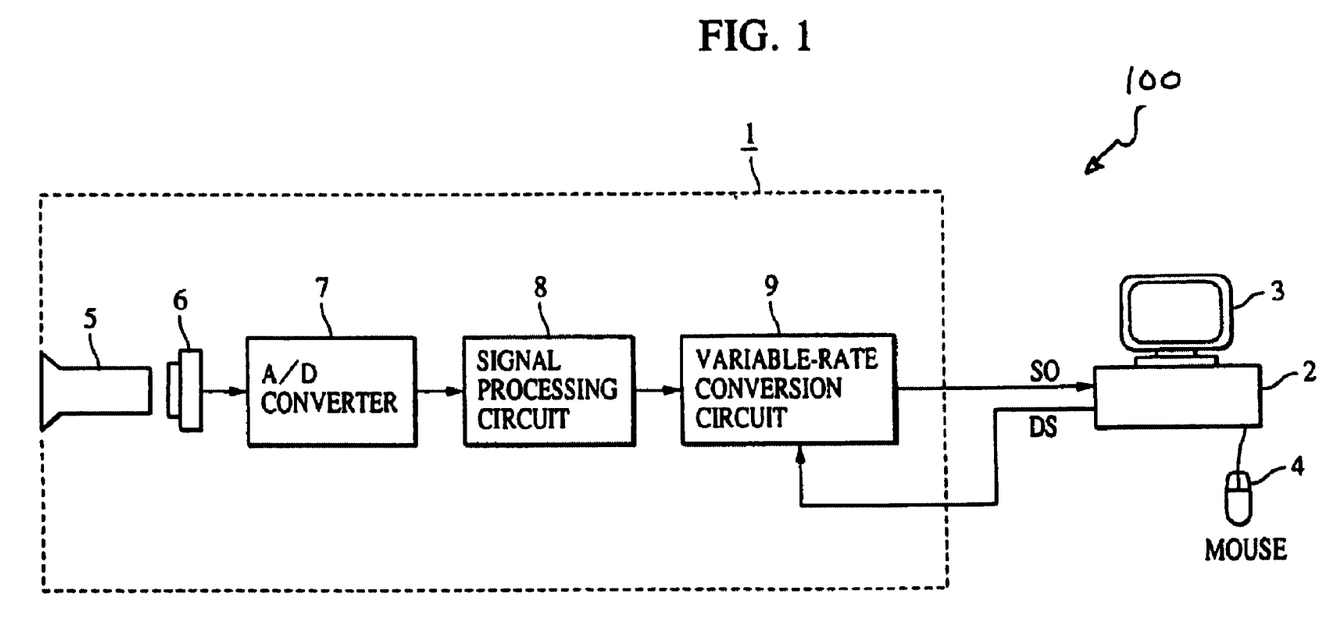
FIG. 1 is a block diagram of an image processing system provided with a video camera and a personal computer, according to an embodiment of the present invention.

FIG. 1 shows an image processing system 100 according to an embodiment of the present invention.

The image processing system 100 is provided with a video camera 1 serving as a camera apparatus according to the present invention. The video camera 1 is connected to a personal computer (PC) 2, which is an external unit. They are connected by, for example, the serial method in IEEE 1394.

The video camera 1 employs a method (digital method) for outputting a digitized image signal (digital image signal), and is provided with an image-pickup lens 5, an image-pickup device 6 on which light output from the image-pickup lens 5 forms an image, an analog-to-digital (A/D) converter 7 to which the output of the image-pickup device 6 is sent, a signal processing circuit 8 to which the output of the A/D converter 7 is sent, and a variable-rate conversion circuit 9 to which the output of the signal processing circuit 8 is sent. The variable-rate conversion circuit 9 is connected to the PC 2.

The PC 2 is connected to a display unit 3 which displays the output of the PC 2 and a mouse 4 serving as a pointing unit of the PC 2.

A series of operations of the video camera 1 will be described below.

Light coming from a subject (not shown) forms an image on the image-forming plane of the image-pickup device 6 through the image-pickup lens 5.

The image-pickup device 6 is formed, for example, of a charge-coupled device and employs the all-pixel read method, in which the signals of all pixels are read at one read scanning without addition.

The light which forms an image on the image-pickup device 6 is opto-electronically converted and sent to the A/D converter 7 as an image-pickup signal.

The A/D converter 7 digitizes the image-pickup signal sent from the image-pickup device 6 and sends it to the signal processing circuit 8.

The signal processing circuit 8 applies specified signal processing, including clamping, gamma correction, black clipping, and white clipping, to the digital image-pickup signal sent from the A/D converter 7 to generate a digital image signal.

The digital image signal generated by the signal processing circuit 8 is sent to the variable-rate conversion circuit 9.

The PC 2 sends a control output signal DS to the variable-rate conversion circuit 9. The control output signal DS is a control signal including information (specified output data rate) which indicates a data rate handled in the PC 2. The specified output data rate, which will be described in detail later, can be set to the data rate suited to the desired image quality by the user with an operation of the mouse 4.

The variable-rate conversion circuit 9 converts the digital image signal sent from the signal processing circuit 8 to a digital image signal having the rate specified by the control output signal DS sent from the PC 2, and outputs it to the PC 2 as image data SO.

Therefore, the video camera 1 sends to the PC 2 the image data SO, which has a data rate handled by the PC 2.

The PC 2 applies certain image processing to the image data SO sent from the video camera 1 with software processing, displays the data on the screen of the display unit 3, and stores the data in a memory (not shown) built in the PC 2 or in a hard disk unit (not shown).

In the above operations, the user specifies each operation to the PC 2 with an arrow cursor (mouse cursor) on the screen of the display unit 3, and the PC 2 operates accordingly.

As described above, since the video camera 1 is provided with the variable-rate conversion circuit 9, and this conversion circuit 9 converts the digital image signal sent from the signal processing circuit 8 to the image data SO having the rate specified by the control output signal DS sent from the PC 2 and outputs it to the PC 2, the PC 2 applies certain image processing to the image data SO without converting the data rate of the image data SO sent from the video camera 1.

Since the image-pickup device 6 employs the all-pixel read method, it is unnecessary to provide interlaced scanning when the data rate is converted in the variable-rate conversion circuit 9, and high-quality image data SO is obtained.

Since the video camera 1 is connected to the PC 2 by the serial method of IEEE 1394, two signals, the image data SO and the control output signal DS, can be transferred at the same time through one cable, and the cable is easily disconnected or connected.

The control output signal DS, which is sent from the PC 2 to the video camera 1, may include image data information required by the PC 2 to have the video camera 1 output image data according to the information.

In this case, the video camera 1 outputs to the PC 2 only the image data required by the PC 2 as image data SO. When the image data required by the PC 2 needs to have high quality, the output data rate is set to that suited to the high-quality image. When the image data required by the PC 2 need to have just low quality, the output data rate is set to a lower one. In this way, the load of the PC 2 can be reduced.

Figure 2:
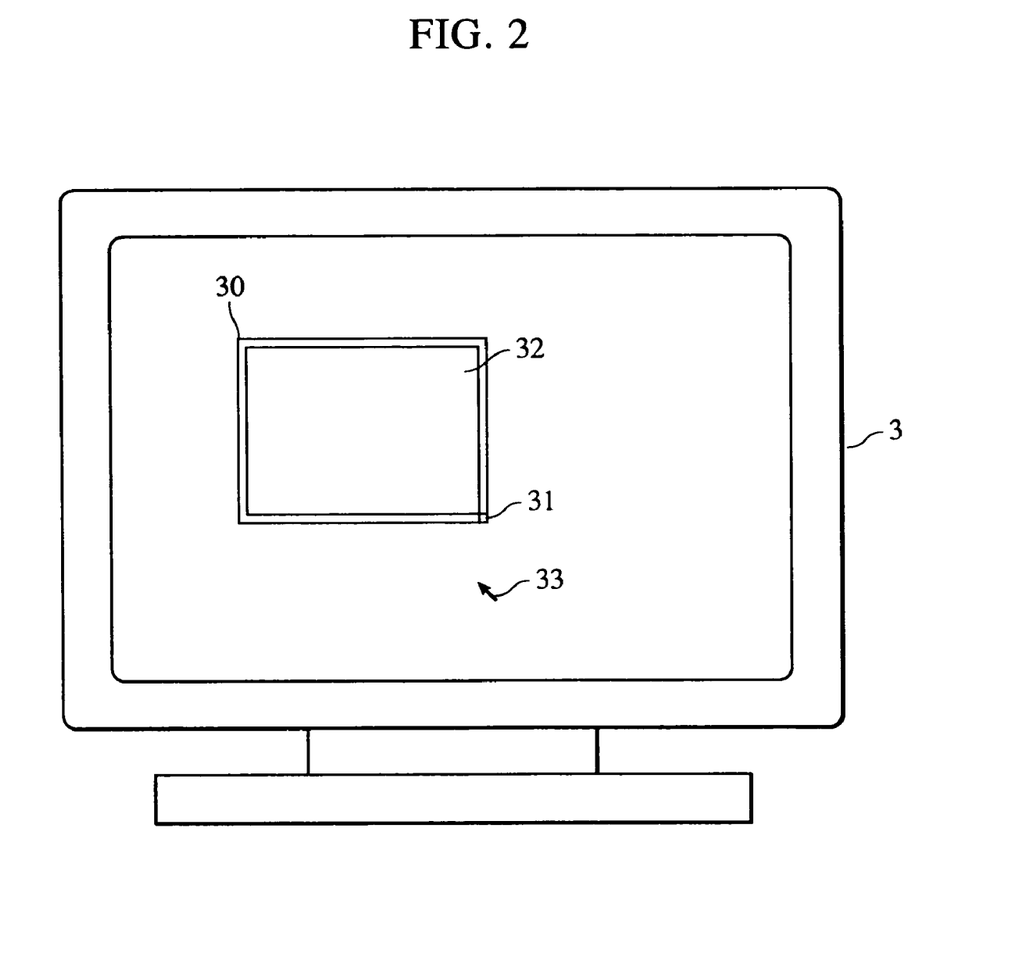
FIG. 2 is a view illustrating a screen on a display unit connected to the personal computer.

The display unit 3 will be described next in detail.

The display unit 3 (FIG. 2) displays on the screen the image data SO output from the video camera 1 and generates a control output signal DS to be sent to the video camera 1.

On the screen of the display unit 3, a display frame 30, a size-change button 31, an image display area 32, and a mouse cursor 33 are displayed, for example, as shown in FIG. 2. The image data SO input to the PC 2 is displayed inside the image display area 32 as a motion picture.

To change the size of the display frame 30, the user needs to move the mouse cursor 33 by the use of the mouse 4 to the size-change button 31, to press a button (not shown) on the mouse 4, again to move the mouse cursor 33 to the desired position with the button being pressed, and to release the button of the mouse 4. Accordingly, the size of the image displayed on the image display area 32 changes.

When the size of the display frame 30 is specified and that of the image display area 32 is also specified as described above, the PC 2 outputs to the video camera 1 a control output signal DS including the specified output data rate, and the video camera 1 changes the data rate of the image data SO to be output, according to the control output signal DS.

Figure 3:
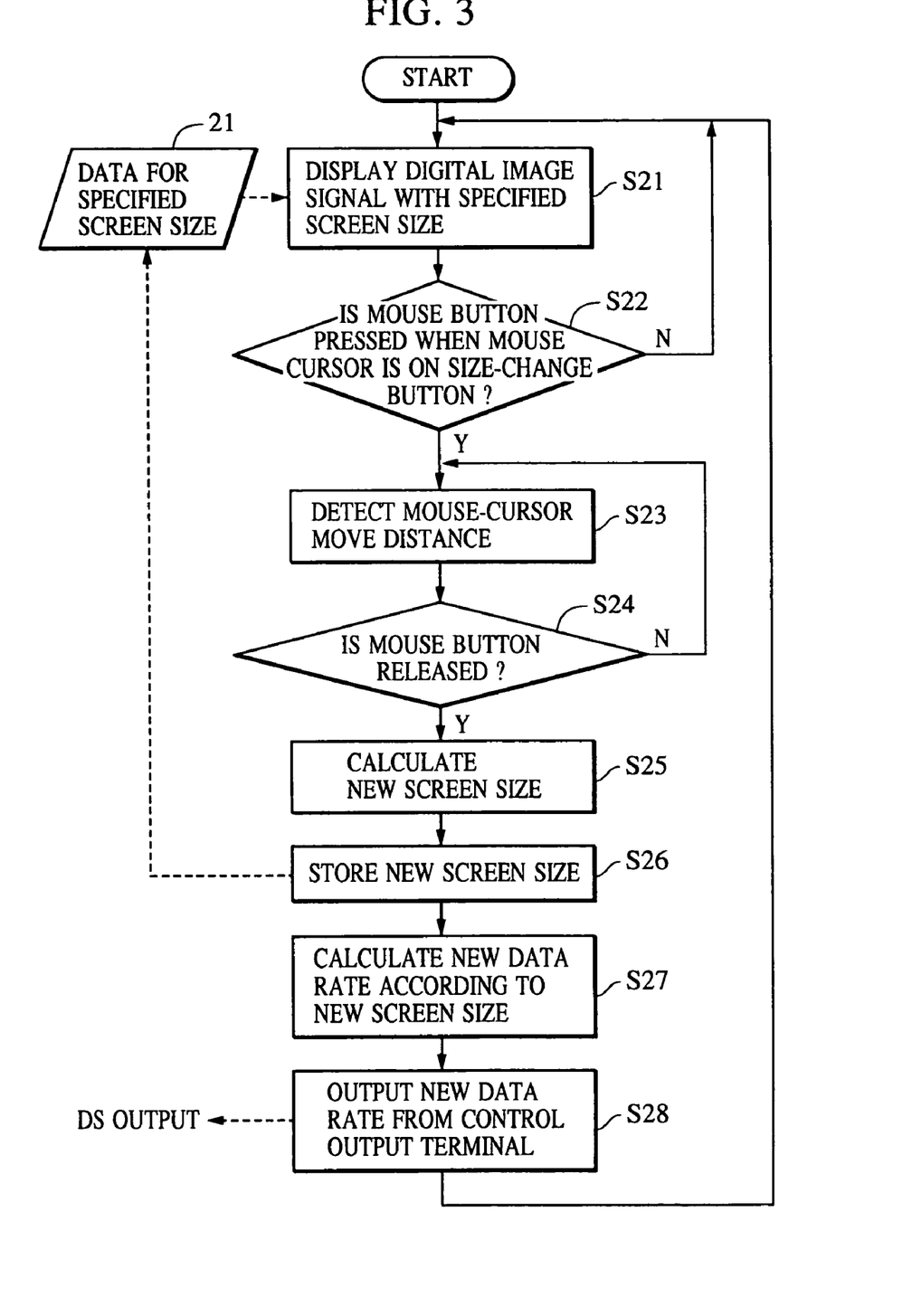
FIG. 3 is a flowchart showing control processing in the personal computer.

Control processing for generating a control output signal DS described above in the PC 2 will be described next in detail.

A program based on the flowchart shown in FIG. 3, for example, is stored in a memory in advance in the PC 2. The PC 2 executes the program and outputs a control output signal DS to the video camera 1.

According to the data of the sizes (hereinafter called a screen size) of the display frame 30 and the image display area 32 stored in a memory 21 inside the PC 2 in step S26, which is described later, the PC 2 controls the display unit 3 such that the image data SO sent from the video camera 1 is displayed on the image display area 32 (step S21).

The PC 2 determines whether a button (not shown) of the mouse 4 is pressed when the mouse cursor 33 is positioned on the size-change button 31 (step S22).

In the determination processing of step S22, if it is determined that the button has not been pressed, the procedure returns to the processing of step S21.

In the determination processing of step S22, when it is determined that the button has been pressed, the PC 2 reads the current coordinates of the mouse cursor 33 and detects the distance the mouse cursor has moved (step S23).

The PC 2 determines next whether the button (not shown) of the mouse 4 has been released (step S24).

In the determination processing of step S24, if it is determined that the button has not been released, the procedure returns to the processing of step S23.

In the determination processing of step S24, when it is determined that the button has been released, the PC 2 calculates the current screen size according to the movement distance of the mouse cursor 33 detected in step S23 (step S25).

Then, the PC 2 stores in the memory 21 the screen size calculated in step S25 as specified screen size data (step S26).

The PC 2 calculates a data rate according to the screen size calculated in step S25 (step S27).

The PC 2 generates a control output signal DS including the data rate information calculated in step S27, and outputs the control output signal DS to the video camera 1 through a control output terminal (not shown) (step S28). The procedure returns to the processing of step S21.

With the above operations, the video camera 1 sends image data SO having the data rate according to the screen size specified on the screen of the display unit 3. The PC 2 controls the display unit 3 such that the image data SO sent from the video camera 1 is displayed inside the image display area 32.

Figure 4:
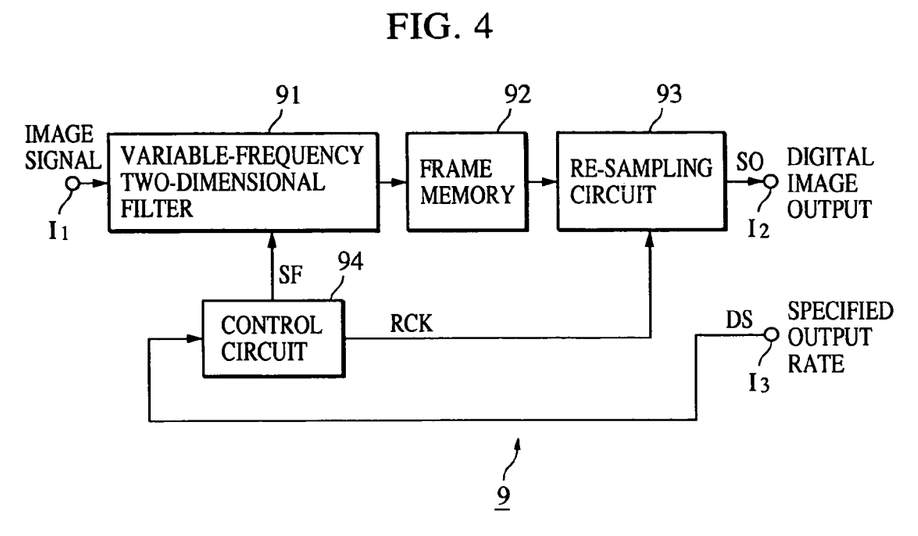
FIG. 4 is a block diagram of a variable-rate conversion circuit in the video camera.

The variable-rate conversion circuit 9 in the video camera 1 will be described below in detail.

The variable-rate conversion circuit 9 includes, for example as shown in FIG. 4, a variable-frequency two-dimensional filter 91 to which an image signal is sent from the signal processing circuit 8 through an input terminal I1, a frame memory 92 to which the output of the variable-frequency two-dimensional filter 91 is sent, a re-sampling circuit 93 to which the output of the frame memory 92 is sent, and a control circuit 94 to which the PC 2 sends a control output signal DS through an input terminal I3. The control circuit 94 outputs signals to the variable-frequency two-dimensional filter 91 and to the re-sampling circuit 93 so that the re-sampling circuit 93 sends image data SO to the PC 2 through an output terminal 12.

In the variable-rate conversion circuit 9, the control circuit 94 sets a spatial-frequency band for the variable-frequency two-dimensional filter 91 according to the control output signal DS sent from the PC 2 through the input terminal I3, and generates a re-sampling clock RCK for the re-sampling circuit 93.

The variable-frequency two-dimensional filter 91 applies band limitation to the image signal sent from the signal processing circuit 8 through the input terminal I1 according to the spatial-frequency band SF specified by the control circuit 94, and outputs it to the frame memory 92.

The variable-frequency two-dimensional filter 91 will be described in detail later.

The frame memory 92 temporarily stores the signal output from the variable-frequency two-dimensional filter 91.

The re-sampling circuit 93 re-samples the signal stored in the frame memory 92 with the use of the re-sampling clock RCK sent from the control circuit 94, and sends it as image data SO to the PC 2 through the output terminal 12.

With the variable-rate conversion circuit 9 having the above configuration, image deterioration such as aliasing distortion, caused by converting the rate of an image signal, can be prevented. Therefore, the variable-rate conversion circuit 9 provides high-quality image data SO having no image-quality deterioration. In addition, the maximum resolution at the output data rate specified by the control output signal DS is obtained.

The variable-rate conversion circuit 9 is provided with the variable-frequency two-dimensional filter 91. Instead of the filter 91, a variable-frequency three-dimensional filter which also performs filtering in the time domain may be provided.

In this case, the screen size and the number of frames per second are specified as output data rates in a control output signal DS, and the control circuit 94 specifies the best suited time and spatial frequency-band characteristics for the variable-frequency three-dimensional filter according to the specified output data rates. Therefore, aliasing distortion in the time domain caused by a reduced frame rate, namely, a phenomenon in which a motion is not smooth, is prevented. High-quality image data SO is obtained.

The variable-rate conversion circuit 9 is provided with the re-sampling circuit 93 and the frame memory 92 separately. Instead of the re-sampling circuit 93, the read clock of the frame memory 92 may be used as the re-sampling clock RCK. This reduces the circuit size.

The frame memory 92 may be of a multiple-line read type so as to be used as both the current frame memory 92 and the memory required inside the variable-frequency two-dimensional filter 91. This further reduces the circuit size.

Figure 5:
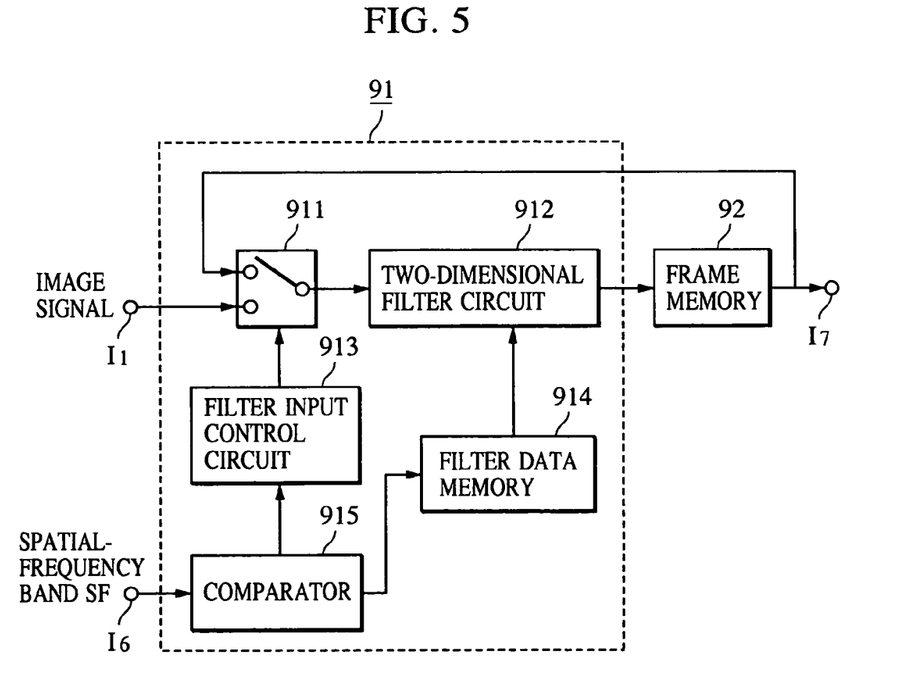
FIG. 5 is a block diagram of the variable-frequency two-dimensional filter circuit of the variable-rate conversion circuit.

The variable-frequency two-dimensional filter 91, described above, will be explained in detail next.

The variable-frequency two-dimensional filter 91 includes, for example as shown in FIG. 5, a switch circuit 911 to which an image signal is sent through the input terminal I1, a two-dimensional filter circuit 912 to which the output of the switch circuit 911 is sent, a comparator 915 to which the spatial-frequency band SF is sent from the control circuit 94 shown in FIG. 4 through an input terminal I6, a filter input control circuit 913 to which an output of the comparator 915 is sent, and a filter data memory 914 to which an output of the comparator 915 is sent.

The output of the filter input control circuit 913 is sent to the switch circuit 911, the output of the filter data memory 914 is sent to the two-dimensional filter circuit 912, and the output of the two-dimensional filter circuit 912 is sent to the frame memory 92 as the output of the variable-frequency two-dimensional filter 91.

The output of the frame memory 92 is sent to the re-sampling circuit 93 shown in FIG. 4 through an output terminal 17 and also to the switch circuit 911.

A series of operations of the variable-frequency two-dimensional filter 91 will be described below.

When the control circuit 94 sends the spatial-frequency band SF to the comparator 915 through the input terminal 16, the comparator 915 compares the spatial-frequency bands specified in advance with the spatial-frequency band SF sent from the control circuit 94.

The filter data memory 914 stores the coefficient data of various spatial filters in advance.

The comparator 915 selects the coefficient data of a suited band among the various coefficient data stored in the filter data memory 914, according to the result of comparison between the specified bands and the spatial-frequency band SF, and sends a control signal described later to the filter input control circuit 913, as required.

The switch circuit 911 receives an image signal from the signal processing circuit 8 shown in FIG. 1 through the input terminal I1 and the output of the frame memory 92.

The filter input control circuit 913 controls switching of the switch circuit 911 according to the control signal sent from the comparator 915.

Therefore, the switch circuit 911 sends the image signal sent from the input terminal I1 or the output signal of the frame memory 92 to the two-dimensional filter circuit 912 according to the switching operation of the filter input control circuit 913.

The two-dimensional filter circuit 912 applies band limitation to the signal sent from the switch circuit 911 by the use of the coefficient data selected by the comparator 915 among the various coefficient data stored in the filter data memory 94, and outputs it to the frame memory 92.

The output of the frame memory 92 is sent to the re-sampling circuit 93 shown in FIG. 4 through the output terminal 17 and also to the switch circuit 911 as described above.

The comparator 915 described above will be mentioned in detail below.

In the comparator 915, the filter bands corresponding to the various coefficient data stored in the filter data memory 914 are set.

The comparator 915 compares the set filter bands with the spatial-frequency band SF and outputs the band which is the closest to but does not exceed the spatial-frequency band SF to the filter data memory 914.

With this operation, the coefficient data of a suited band is selected among the various coefficient data stored in the filter data memory 914, and the characteristics of the two-dimensional filter circuit 912 are set.

When it is determined from the comparison result between the set frequency bands and the spatial-frequency band SF that the spatial-frequency band SF is smaller than the smallest value of the set filter bands corresponding to the various coefficient data stored in the filter data memory 914, the comparator 915 sends the above-described control signal to the filter input control circuit 913.

When the filter input control circuit 913 receives the control signal from the comparator 915, the filter input control circuit 913 switches the switch circuit 911 after an image signal of one frame is input to the switch circuit 911 through the input terminal I1.

With this operation, the image signal to which the band limitation has been applied once by the two-dimensional filter circuit 912 and stored in the frame memory 92 is again input to the two-dimensional filter circuit 912.

The frame memory 92, after an interval of a certain integer, is read in the horizontal and vertical directions. Then, the two-dimensional filter circuit 912 has a lower-frequency spatial filter characteristic.

According to the above variable-frequency two-dimensional filter 91, when the band is very narrow, the number of output frames per second may be reduced. As compared with a filter having a very narrow band, the variable-frequency two-dimensional filter 91 has a much smaller circuit size.

When the image signal to which the band limitation has been applied once by the two-dimensional filter circuit 912 and stored in the frame memory 92 is again input to the two-dimensional filter circuit 912, namely in the second filtering processing, since the image signal input to the two-dimensional filter circuit 912 has reduced data, the actual time required for processing is made very short, preventing great reduction in the number of frames.

The image signal output from the frame memory 92 may be further put into the two-dimensional filter circuit 912 a plurality of times as required. With this operation, a very low data rate for icon display, for example, can be obtained.

Various combinations of circuit configurations in the variable-frequency two-dimensional filter 91 can be considered according to the specifications required for this image processing system 100, such as how many types of coefficient data are stored in the filter data memory 914 and whether the output of the frame memory 92 is used.

When the system is required to have as a low cost as possible, for example, a reduced number of coefficient data is stored in the filter data memory 914 and the output of the frame memory 92 is frequently used in a low output data rate. This simplifies the filter data memory 914 and the two-dimensional filter circuit 912.

Conversely, when an increased number of coefficient data is stored in the filter data memory 914, the range of output data rates can be made wide without reducing the frame rate.

The individual components shown in outline are designated by blocks and the drawings are all well-known in the image processing arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method of changing a data rate of image data output from an image capture apparatus, the method comprising the steps of:

calculating a first data rate of the image data according to a first size of a variable display area for displaying the image data;
sending information indicating the calculated first data rate to the image capture apparatus;
changing a size of the variable display area from the first size to a second size in response to a user command;
calculating a second data rate of the image data according to the second size; and
sending information indicating the calculated second data rate to the image capture apparatus.

2. A method according to claim 1, further comprising the step of:
storing the changed size of the variable display area in memory.

3. A method according to claim 1, wherein the image capture apparatus includes a data rate changing unit that changes a data rate of the image data according to the calculated data rate, and wherein the data rate changing unit controls a spatial frequency band of the image data so as to change a data rate of the image data.

4. An apparatus which changes a data rate of image data output from an image capture apparatus, comprising:
calculating means adapted to calculate a first data rate of the image data according to a first size of a variable display area for displaying the image data; and
sending means adapted to send information indicating the calculated first data rate to the image capture apparatus,
wherein if a size of the variable display area is changed from the first size to a second size in response to a user command, said calculating means calculates a second data rate of the image data according to the second size, and said sending means sends information indicating the calculated second data rate to the image capture apparatus.

5. An apparatus according to claim 4, further comprising:
a memory which stores the changed size of the variable display area.

6. An apparatus according to claim 4, wherein the image capture apparatus includes a data rate changing unit that changes a data rate of the image data according to the calculated data rate, and wherein the data rate changing unit controls a spatial frequency band of the image data so as to change a data rate of the image data.

7. A storage medium which stores a computer readable program for performing a method of changing a data rate of image data output from an image capture apparatus, the method comprising the steps of:
calculating a first data rate of the image data according to a first size of a variable display area for displaying the image data;
sending information indicating the calculated first data rate to the image capture apparatus;
changing a size of the variable display area from the first size to a second size in response to a user command;
calculating a second data rate of the image data according to the second size; and
sending information indicating the calculated second data rate to the image capture apparatus.

8. A storage medium according to claim 7, the method further comprising the step of:
storing the changed size of the variable display area in memory.

9. A storage medium according to claim 7, wherein the image capture apparatus includes a data rate changing unit that changes a data rate of the image data according to the calculated data rate, and wherein the data rate changing unit controls a spatial frequency band of the image data so as to change a data rate of the image data.

10. An image capture apparatus comprising:
an image capture unit that captures a digital image;
a conversion unit that converts the digital image into image data; and
a data rate changing unit that changes a data rate of the image data according to a data rate calculated by an external apparatus,
wherein the external apparatus calculates a first data rate of the image data according to a first size of a variable display area for displaying the image data, and sends information indicating the calculated first data rate to the image capture apparatus, and
wherein if a size of the variable display area is changed from the first size to a second size in response to a user command, the external apparatus calculates a second data rate of the image data according to the second size, and sends information indicating the calculated second data rate to the image capture apparatus.

11. An apparatus according to claim 10, wherein the data rate changing unit controls a spatial frequency band of the image data so as to change a data rate of the image data.

12. A method of changing a data rate of image data to be outputted from an image capture apparatus, the method comprising the steps of:
receiving a data rate calculated by an external apparatus; and
changing the data rate of the image data according to the received data rate,
wherein the external apparatus calculates a first data rate of the image data according to a first size of a variable display area for displaying the image data, and sends information indicating the calculated first data rate to the image capture apparatus, and
wherein if a size of the variable display area is changed from the first size to a second size in response to a user command, the external apparatus calculates a second data rate of the image data according to the second size, and sends information indicating the calculated second data rate to the image capture apparatus.

13. A method according to claim 12, further comprising a step of controlling a spatial frequency band of the image data so as to change a data rate of the image data.

* * * * *